(12) United States Patent
Miyazaki et al.

(10) Patent No.: US 9,829,875 B2
(45) Date of Patent: Nov. 28, 2017

(54) SAFETY COMMUNICATION SYSTEM USING IO UNITS COMMUNICATING WITH A PLURALITY OF CPUS

(71) Applicant: FANUC Corporation, Yamanashi (JP)

(72) Inventors: Yoshito Miyazaki, Yamanashi (JP); Hiroshige Ando, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 224 days.

(21) Appl. No.: 14/567,374

(22) Filed: Dec. 11, 2014

(65) Prior Publication Data

US 2015/0177724 A1 Jun. 25, 2015

(30) Foreign Application Priority Data

Dec. 25, 2013 (JP) ................................ 2013-267165

(51) Int. Cl.
*G05B 19/05* (2006.01)
*G05B 19/042* (2006.01)
*G06F 13/00* (2006.01)

(52) U.S. Cl.
CPC ....... *G05B 19/058* (2013.01); *G05B 19/0425* (2013.01); *G05B 19/054* (2013.01); *G06F 13/00* (2013.01); *G05B 2219/25153* (2013.01)

(58) Field of Classification Search
CPC ... G06F 13/00; G06F 13/1631; G05B 19/048; G05B 19/54; G05B 19/058
See application file for complete search history.

(56) References Cited

U.S. PATENT DOCUMENTS

| | | | |
|---|---|---|---|
| 4,200,936 A | 4/1980 | Borzcik et al. | |
| 5,754,780 A * | 5/1998 | Asakawa ............... | G05B 15/02 700/3 |
| 2002/0027884 A1* | 3/2002 | Halme ................... | H04L 43/00 370/253 |
| 2006/0183501 A1 | 8/2006 | Egoshi et al. | |
| 2008/0189445 A1 | 8/2008 | Hada et al. | |

(Continued)

FOREIGN PATENT DOCUMENTS

| | | |
|---|---|---|
| JP | 11-143680 A | 5/1999 |
| JP | 2006-215763 A | 8/2006 |

(Continued)

OTHER PUBLICATIONS

Decision to Grant a Patent dated Sep. 1, 2015, corresponding to Japanese Patent Application No. 2013-267165.

(Continued)

*Primary Examiner* — Tim T Vo
*Assistant Examiner* — Herve Iradukunda
(74) *Attorney, Agent, or Firm* — Hauptman Ham, LLP

(57) ABSTRACT

In a communication system in which a numerical controller and IO units each having a communication controller are connected, communication data is transmitted and received between the numerical controller and the communication controller of the IO units. The communication controller returns the communication data to the numerical controller when an ID contained in the communication data received from the numerical controller matches an ID set to an ID setting unit of the communication controller.

1 Claim, 12 Drawing Sheets

(56) References Cited

U.S. PATENT DOCUMENTS

| | | | |
|---|---|---|---|
| 2010/0257303 A1* | 10/2010 | Lee | G06F 13/4252 |
| | | | 710/316 |
| 2012/0254600 A1* | 10/2012 | Fujimoto | G06F 9/4405 |
| | | | 713/1 |
| 2012/0272018 A1 | 10/2012 | Sato | |
| 2013/0253706 A1 | 9/2013 | Hada et al. | |
| 2015/0066979 A1 | 3/2015 | Zhang et al. | |

FOREIGN PATENT DOCUMENTS

| | | |
|---|---|---|
| JP | 2008-191989 A | 8/2008 |
| JP | 4185142 B2 | 11/2008 |
| JP | 2011-165038 A | 8/2011 |
| JP | 2012-226712 A | 11/2012 |
| JP | 2013-58140 A | 3/2013 |
| JP | 2013-235300 A | 11/2013 |

OTHER PUBLICATIONS

Office Action dated Jun. 2, 2015, corresponding to Japanese patent application No. 2013-267165.

* cited by examiner

SAFETY COMMUNICATION SYSTEM USING IO UNITS COMMUNICATING WITH A PLURALITY OF CPUS

RELATED APPLICATIONS

The present application claims priority to Japanese Application Number 2013-267165, filed Dec. 25, 2013, the disclosure of which is hereby incorporated by reference herein in its entirety.

BACKGROUND OF THE INVENTION

1. Field of the Invention

The present invention relates to a communication system in which a numerical controller and one or more IO units, each having a communication controller, are connected and communication data is transmitted and received between the numerical controller and the communication controllers of the IO units.

2. Description of the Related Art

A configuration, in which a plurality of external signal input/output units (IO units) are connected, is adopted for input/output of DI/DO signals between a numerical controller and a machine tool (not shown). As shown in FIG. 1, DI/DO signals are normally transferred between a numerical controller 10 and an IO unit 30 and between the IO unit 30 and an IO unit 32.

If communication controllers 31, 33 of the IO units 30, 32 confirm that the ID contained in the header of the received communication data matches the ID set to their own setting register, in communication with the numerical controller 10, then the communication controllers 31, 33 recognize that received data is addressed to the communication controllers 31, 33 and return data to the numerical controller 10 (see Japanese Patent Application Laid-Open No. 2008-191989). When a DI/DO signal returned from the IO units 30, 32 is actually used by a sequence program operating inside the numerical controller 10, it is necessary to allocate the DI/DO signal to an internal address of the numerical controller 10. Safety signals needed to avoid danger such as an emergency stop signal and a door switch are contained in the DI/DO signal.

Incidentally, IEC61508, ISO13849-1 and the like exist as safety standards in an electrical and electronics safety related system or a machinery control system. The above safety signals are desirably processed and transferred according to such standards. Japanese Patent Application Laid-Open No. 2013-235300 discloses processing and a transfer method according to a standard.

In Japanese Patent Application Laid-Open No. 2013-235300 described above, as shown in FIG. 2, corresponding to a first CPU 11 and a second CPU 12, the first IO unit 30 and the second IO unit 32 exist, and a high level of safety is secured by safety signals being independently processed and transferred by a set of the first CPU 11 and the first IO unit 30 and a set of the second CPU 12 and the second IO unit 32 (see FIG. 2). The transfer of signal conforms to PROFIsafe and a count value, CRC and the like are attached to communication data. Because, as described above, the set of the first CPU 11 and the first IO unit 30 and the set of the second CPU 12 and the second IO unit 32 are independent of each other, two sets are available as values attached to these sets and are independent of each other.

In this case, it is important that the data attached is unrelated values independent of each other to secure safety. If, for example, the second IO unit 32 erroneously attempts to process data of the first CPU 11, an error occurs because the attached counter value is different. Because of such a mechanism, the combination of the first CPU 11 and the first IO unit 30 and the combination of the second CPU 12 and the second IO unit 32 cannot be changed. That is, it is impossible to allocate a DI/DO signal of the second IO unit 32 to an address of the first CPU 11, to allocate a DI/DO signal of the first IO unit 30 to an address of the second CPU 12, or to allocate the first IO unit 30 to both addresses of the first CPU 11 and the second CPU 12. This is because, as described above, the counter value and CRC attached to communication data correspond to the combination of the CPU and the IO unit and cannot be changed.

In recent years, machine tools are increasingly diversified and it is not rare to design a machine having a wide range of variations. The number of DI/DO signals needed for the configuration is different from variation to variation. From the viewpoint of cost, it is important to design each configuration such that the number of IO units to be connected is minimized.

However, if configured by using the method described in JP 2013-235300 mentioned above in case where a safety signal is contained in a DI/DO signal, more IO units than necessary may have to be connected because the combination of the CPU and the IO unit cannot be changed. For example, consider first a case where a machine whose total points of a safety DI signal are 32 points (bits) is configured by an IO unit having a DI signal of 32 points per unit. The two (first and second) CPUs 11, 12 are included and the safety DI signal has 32 points and therefore, the machine can be configured by two IO units of the first IO unit 30 and the second IO units 32, each having a DI signal of 32 points, as shown in FIG. 3.

However, when a machine whose total points of the safety DI signal are 48 points is designed as a product line of the same machine, the increased points of the safety DI signal from the system in FIG. 3 are 16 points and a DI signal of 2×16 points=32 points is enough and, thus, total points could be covered by adding one IO unit (third IO unit 40) of 32 points. In reality, however, as described above, the first and second IO units need to be combined with the first and second CPUs 11, 12, respectively. Thus, further two IO units, the third IO unit 40 and a fourth IO unit 42, need to be connected (see FIG. 4).

When a safety DI/DO signal is configured, therefore, according to the above method described in Japanese Patent Application Laid-Open No. 2013-235300, a problem that more IO units than necessary may need to be connected is posed due to constraints of the allocation of CPUs and IO units.

SUMMARY OF THE INVENTION

Therefore, to solve the above problem of conventional technology, an object of the present invention is to provide a safety communication system using IO units communicating with a plurality of CPUs.

In a communication system according to the present invention, a numerical controller and one or more IO units are connected, and each of the IO units includes a communication controller to transmit and receive communication data between the numerical controller and the communication controller of the IO units. The communication controller includes a plurality of ID setting units configured to set IDs of the communication controller, and a comparator configured to compare an ID contained in the communication data received from the numerical controller with IDs set to the plurality of ID setting units. As a result of comparison by the comparator, when the ID contained in the communication data received from the numerical controller matches any one of the IDs set to the plurality of ID setting units, the communication data is returned to the numerical controller.

The communication controller may further include a plurality of safety communication data processing units that process safety communication data, in association with the plurality of ID setting units.

The communication controller may further comprises a plurality of external input/output signal allocation correspondence setting units that specify an external input/output signal to which the communication data corresponds, from among a plurality of external input/output signals, in association with the plurality of ID setting units.

A safety communication system using IO units communicating with a plurality of CPUs can be provided according to the present invention.

BRIEF DESCRIPTION OF THE DRAWINGS

The above and other objects and features of the present invention will be apparent from the following description of an embodiment with reference to appended drawings.

DETAILED DESCRIPTION OF THE PREFERRED EMBODIMENT

Figure 1:
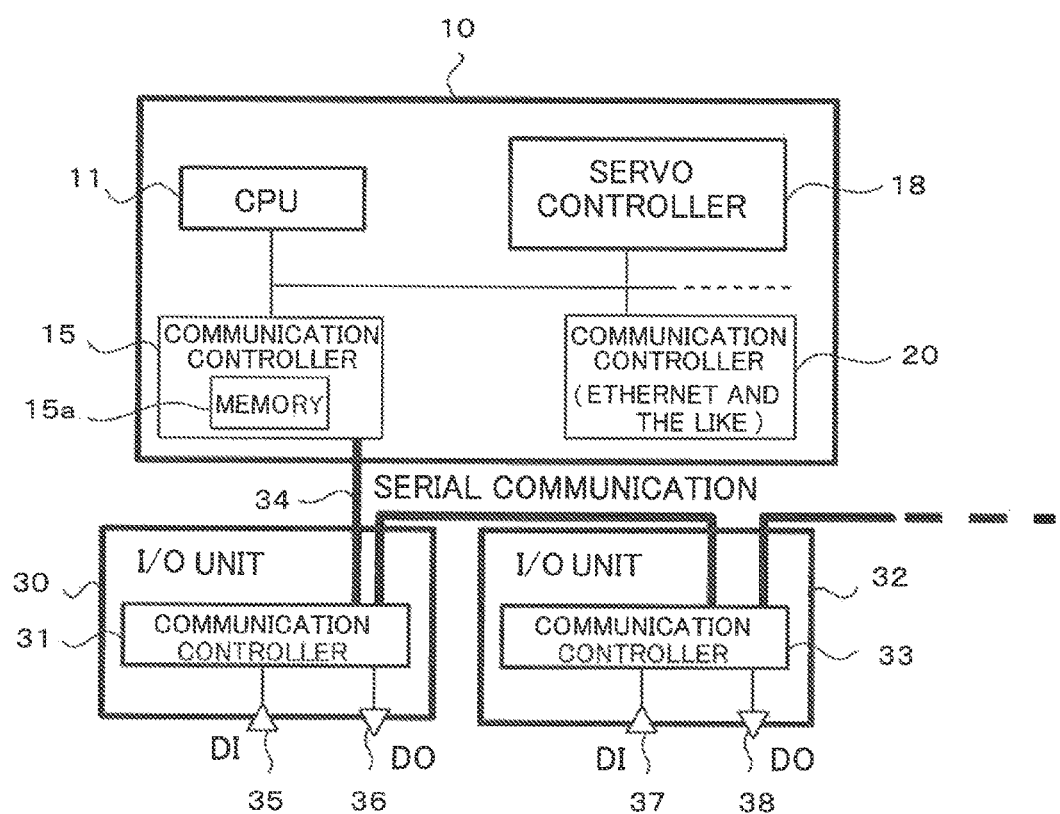
FIG. 1 is a diagram showing that DI/DO signals are transferred between a numerical controller and IO units.
Figure 2:
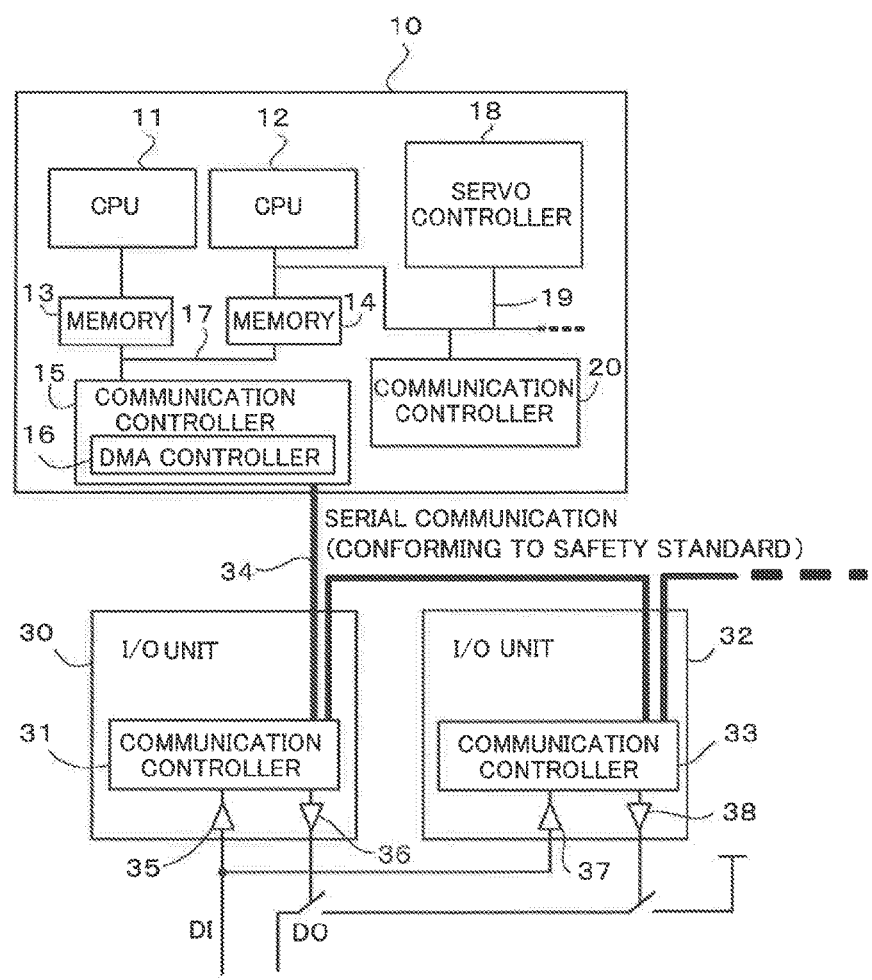
FIG. 2 is a diagram showing a conventional safety communication system in which a set of a first CPU and a first IO unit and a set of a second CPU and a second IO unit independently process and transfer a safety signal.
Figure 3:
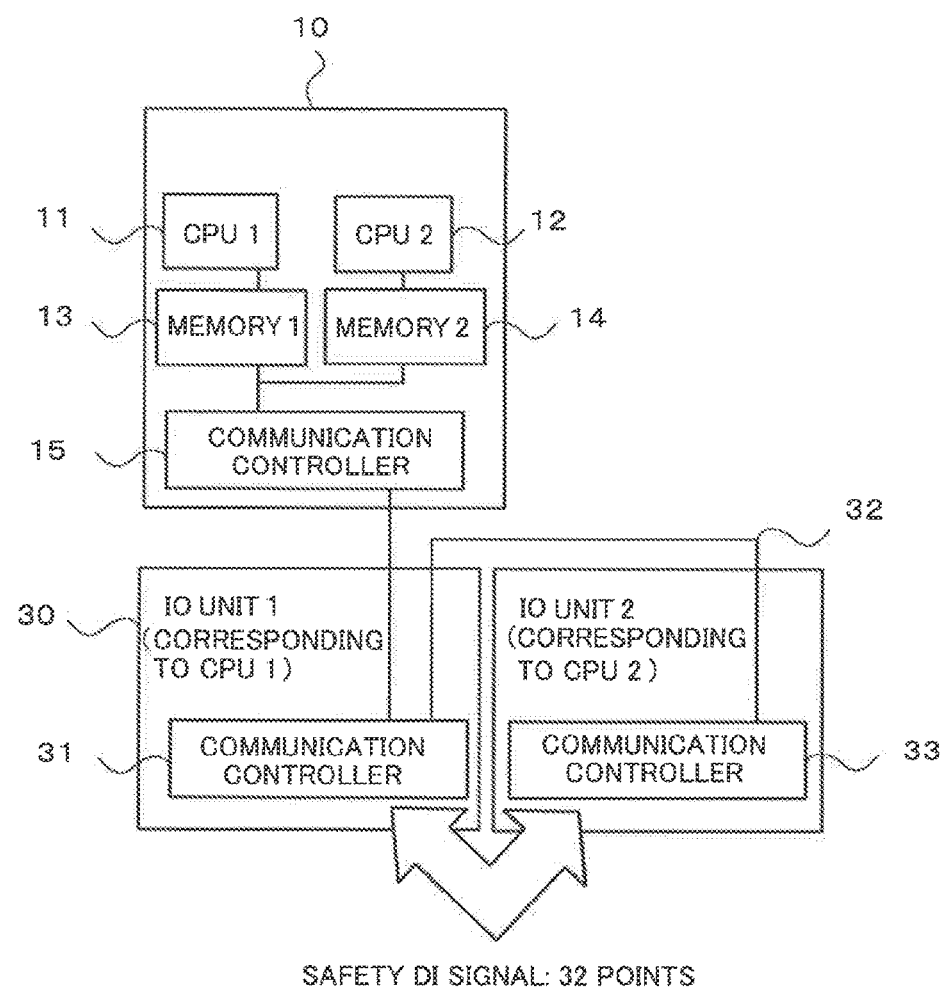
FIG. 3 is a diagram showing the conventional safety communication system configuring a machine whose total points of a safety DI signal are 32 points (bits) by IO units having a DI signal of 32 points per unit.
Figure 4:
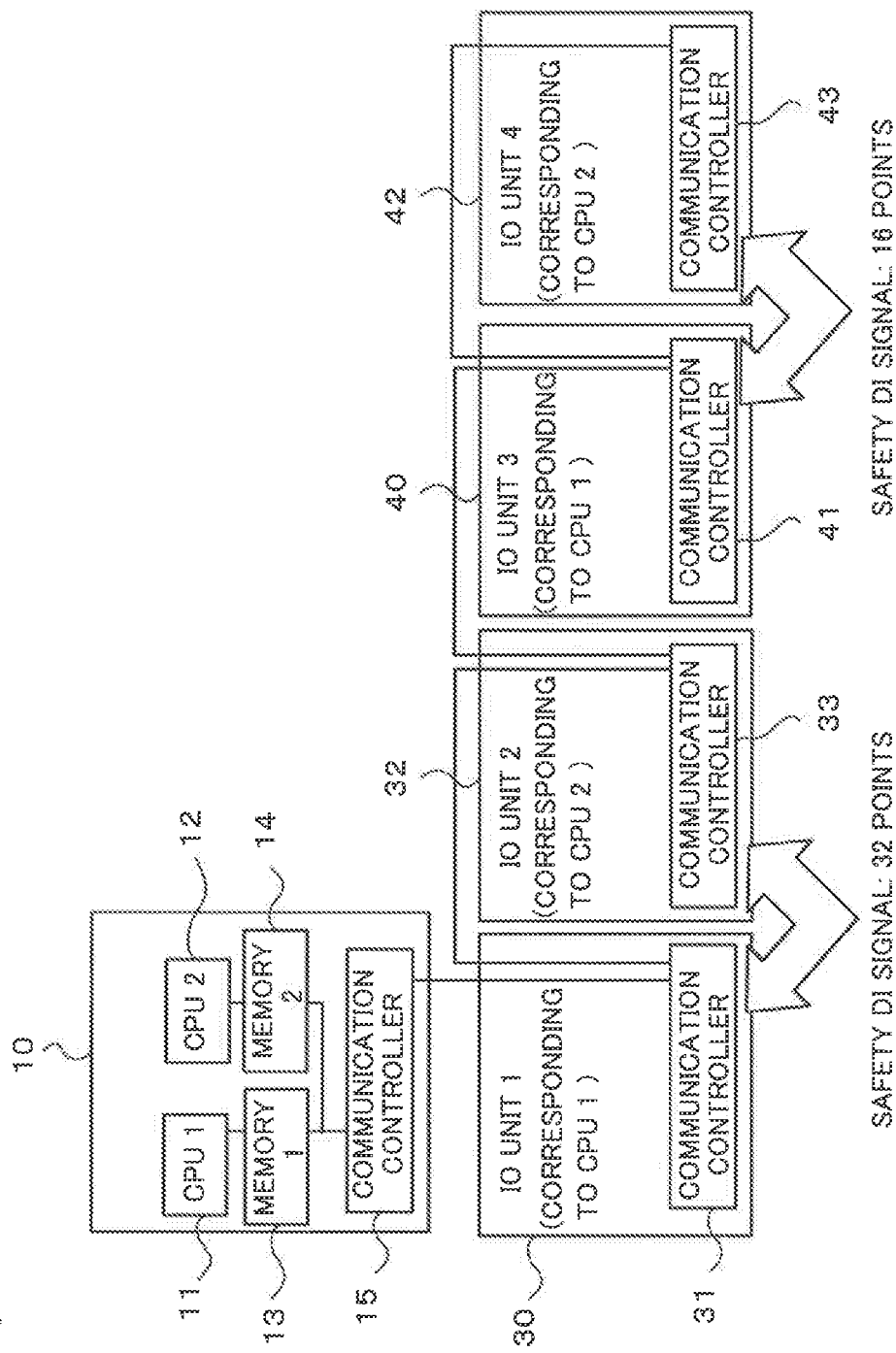
FIG. 4 is a diagram illustrating that further two IO units need to be connected to the safety communication system in FIG. 3.
Figure 5:
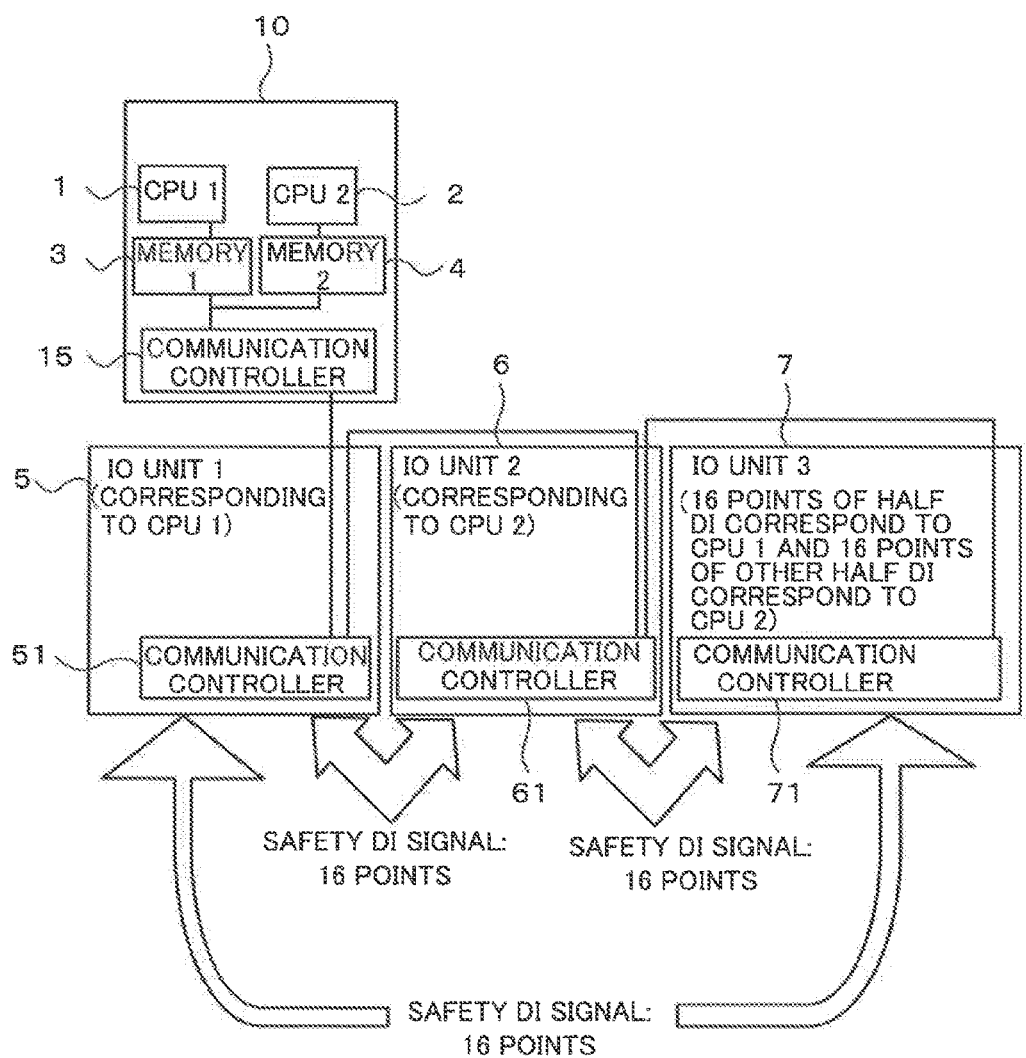
FIG. 5 is a diagram showing the configuration of a safety communication system according to the present invention in which a communication controller of an IO unit contains two registers to which the ID of the communication controller is set.

FIG. 5 is a diagram showing the configuration of a safety communication system according to the present invention in which a communication controller of an IO unit contains two registers to which the ID of the communication controller is set.

First, second, and third IO units 5, 6, 7 mounted on the main body of a machine tool are connected by daisy chaining to the numerical controller 10 controlling the machine tool. In communication with the numerical controller 10, two registers for setting ID for recognition of data addressed to the third IO unit 7 as a slave are contained in a communication controller 15. 16 points (bits) of a half the DI signal of the third IO unit 7 correspond to a first CPU 1 and 16 points (bits) of the other half of the DI signal correspond to a second CPU 2.

16 points of a half DI of the third IO unit 7 are allocated to addresses of the first CPU 1 and 16 points of the other half are allocated to addresses of the second CPU 2. A safety DI signal needs to be processed by being allocated to the two (first and second) CPUs 1, 2. In other words, to a DI receiver input of one IO unit, a DI receiver input of another IO unit to be paired with the one IO unit exists.

Thus, DIs of the first IO unit 5, the second IO unit 6, and the third IO unit 7 are also combined such that two DI receiver inputs become a pair. Then, by combining 16 points of a half DI of the first IO unit 5 and 16 points of a half DI of the second IO unit 6 as a pair (first pair), 16 points of the other half of the second IO unit 6 and 16 points of a half DI of the third IO unit 7 as a pair (second pair), and 16 points of the other half of the third IO unit 7 and 16 points of the other half of the first IO unit 5 as a pair (third pair), all 48 points of DI are allocated to each of addresses of the first CPU 1 and the second CPU 2 and input.

If a communication controller 71 of the third IO unit 7 confirms that the ID contained in the header of communication data received by the communication controller 71 matches any one ID set to two ID setting registers of the communication controller 71, then the communication controller 71 returns data to the numerical controller 10. The communication controller 71 also processes safety signals corresponding to the two (first and second) CPUs 1, 2 according to the register of the communication controller 71 set in advance.

As described above, the first CPU 1 and the second CPU 2 can exchange safety communication data with the communication controller 71 of the third IO unit 7 to input and output DI/DO signal corresponding to the first and second CPUs 1, 2. Because addresses of both of the first and second CPUs 1, 2 can be allocated to a DI/DO signal of the third (one) IO unit 7, necessary safety DI/DO signal points can be configured by the minimum number of IO units being connected.

Figure 6:
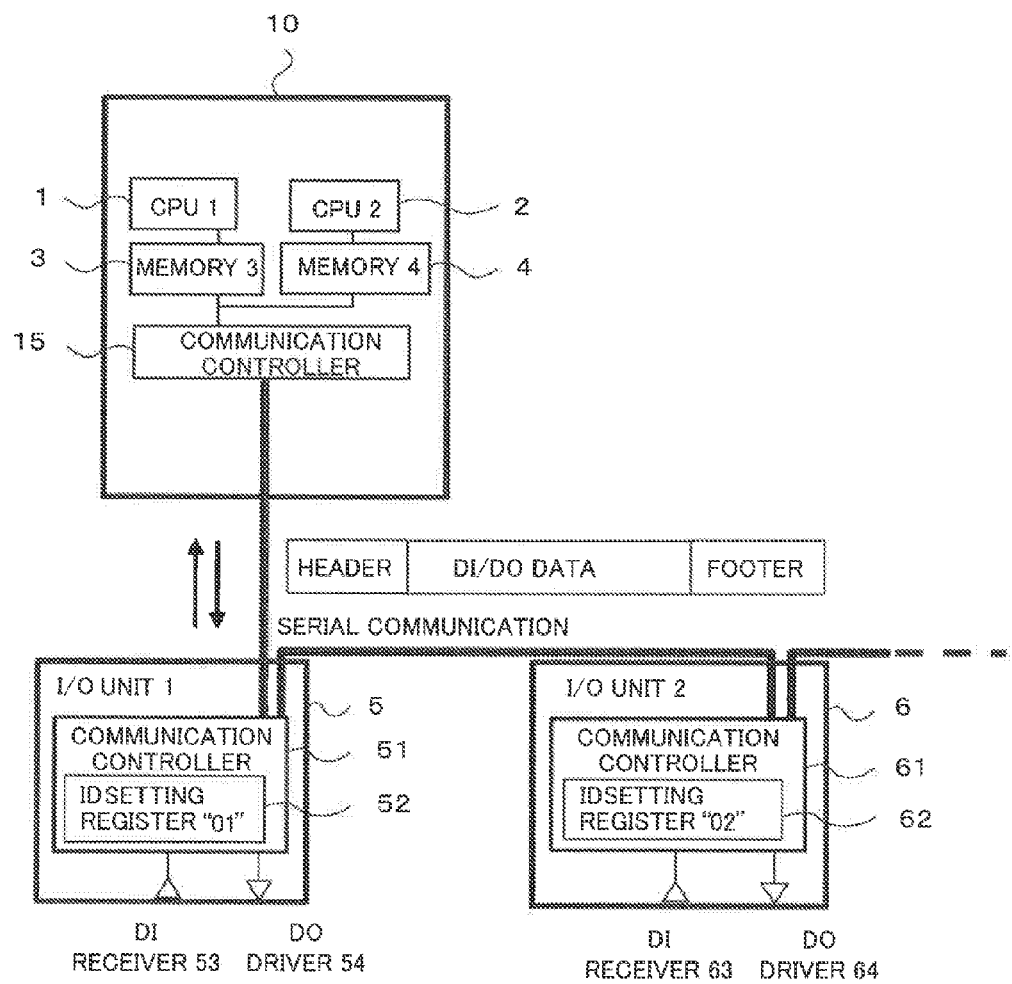
FIG. 6 is a diagram showing communication between the numerical controller and the IO units.

FIG. 6 is a diagram illustrating communication between the numerical controller and the IO units.

In a configuration in which a numerical controller and one or a plurality of IO units are connected, the numerical controller 10 includes the communication controller 15 and two independent CPUs, i.e. the first CPU 1 and the second CPU 2. The first and second IO units 5, 6 include communication controllers 51, 61, drivers 54, 64 for inputting and outputting DI/DO signals transferred by communication to the outside (machine side), and receivers 53, 63, respectively. The communication controllers 51, 61 of the first and second IO units 5, 6 include ID setting registers 52, 62 representing their own IDs, respectively. The communication controller 15 of the numerical controller 10 operates as a master, whereas the communication controllers 51, 61 of the first and second IO units 5, 6 operate as slaves, and both perform one-on-one communication in master-slave mode.

Figure 7:
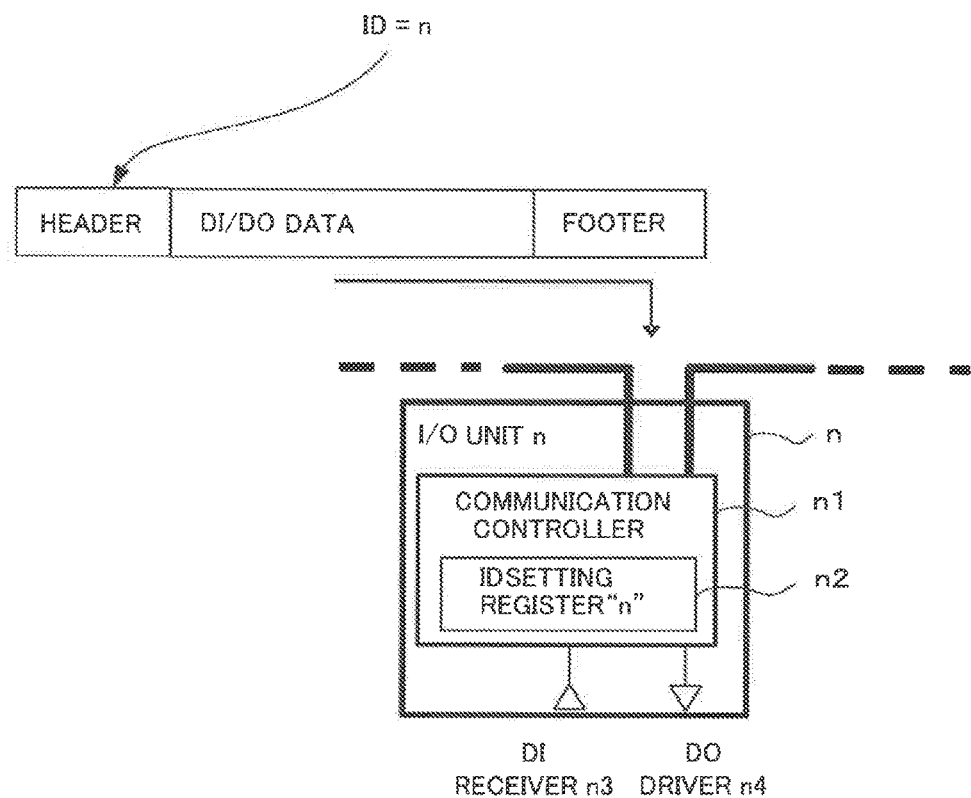
FIG. 7 is a diagram illustrating that the communication controller of the IO unit replies to the numeric controller if IDs of a receiving header and the register match.

FIG. 7 is a diagram illustrating that the communication controller of the IO unit sends a reply to the numeric controller if IDs of a receiving header and the register match.

If a communication controller n1 of an n-th IO unit n of IO units connected to a numerical controller confirms that the ID contained in the header of received communication data in communication with the numerical controller 10 matches the ID set to the setting register n2 of the communication controller n1, then the communication controller n1 recognizes that received data is data addressed to the communication controller n1 and sends a reply to the effect to the numerical controller 10.

Figure 9:
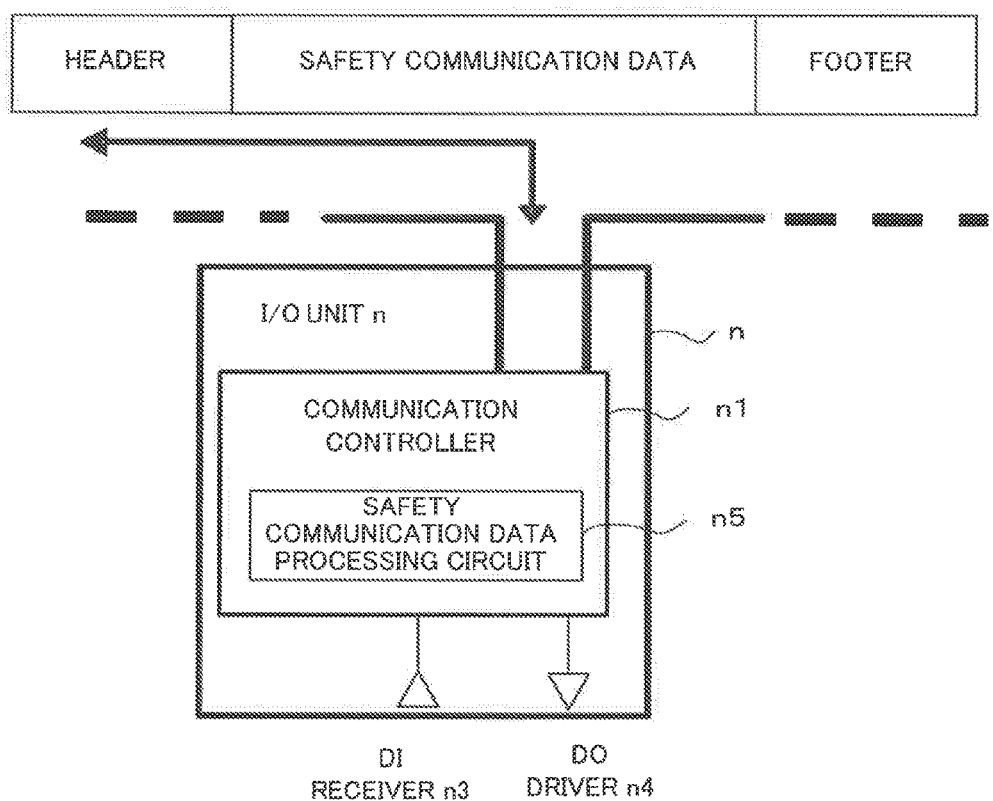
FIG. 9 is a diagram illustrating that the communication controller of the IO unit includes the safety communication data processing unit to process the safety communication data.

FIG. 9 is a diagram illustrating that the communication controller of the IO unit includes a safety communication data processing unit to process safety communication data.

The communication controller n1 of the IO unit n includes a circuit to process safety communication data (see FIG. 8) and processes the serial number, the counter, and CRC (cyclic redundancy code) contained in the safety communication data transmitted or received by the communication controller n1.

Figure 8:
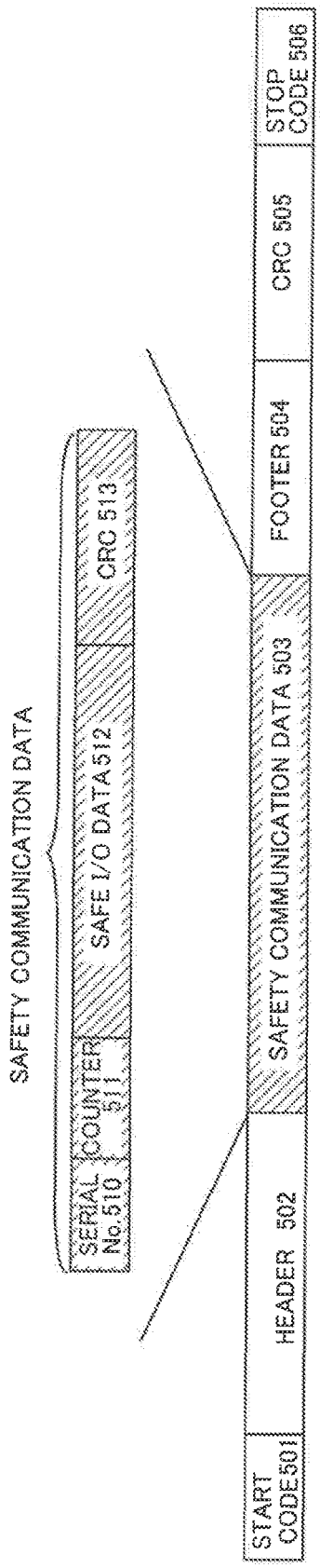
FIG. 8 is a diagram showing safety communication data processed by a safety communication data processing unit contained in the communication controller of the IO unit in FIG. 9.

As shown in FIG. 8, a serial number set in advance for each IO unit (slave) is attached to the head of the safety communication data. The first CPU 1, the second CPU 2, and a safety communication data processing circuit n5 of the communication controller n1 contained in the IO unit n (see FIG. 9) check the serial numbers received by each of them. If an invalid serial number is detected, an error occurs or an alarm is issued, and the received data is discarded.

Figure 10A:
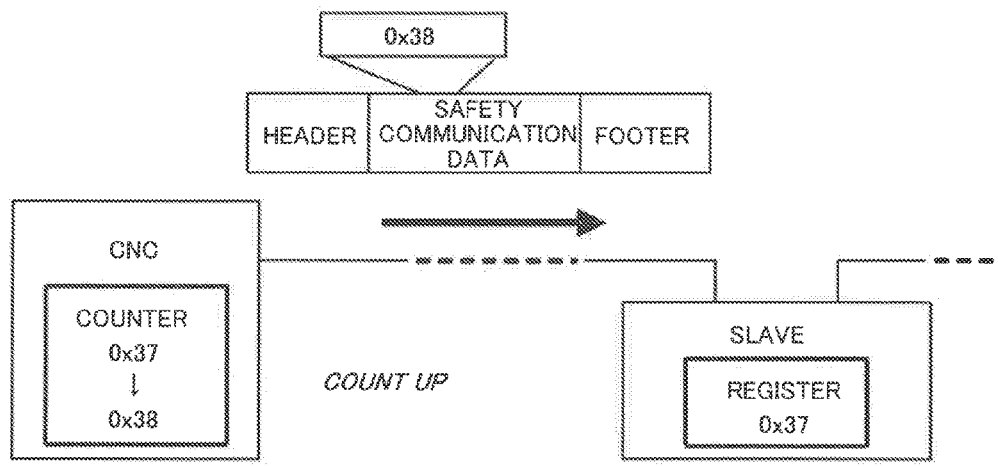
FIGS. 10A to 10C are diagrams showing that safe data is transmitted and received between a master (numerical controller) and a slave.
Figure 10B:
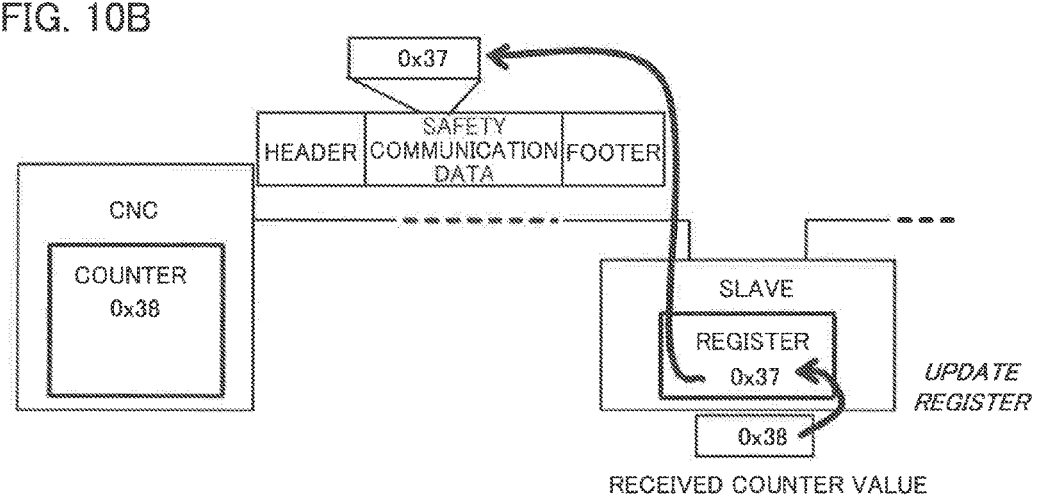
Figure 10C:
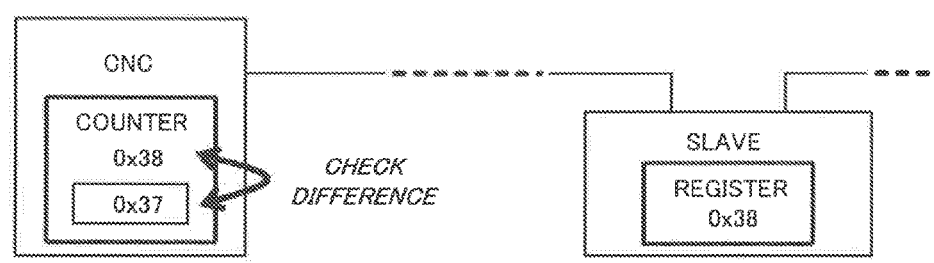

FIGS. 10A to 10C are diagrams showing that safety communication data is transmitted and received between a master (numerical controller) and a slave.

The counter (see FIG. 8) contained in the safety communication data is assigned when data is transmitted from the numerical controller 10 as the master to the IO unit as the slave (see FIG. 10A). On the other hand, when the slave receives the safety communication data from the master, the slave temporarily stores the counter value contained in the safety communication data in an internal register and instead, returns the counter value originally stored in the internal register to the master (see FIG. 10B). When the master receives a reply from the slave, the master checks a difference between the counter value issued by the master and the counter value contained in the received safety communication data (see FIG. 10C). After the communication terminates, the master adds 1 to the issued counter value during next communication to repeat a similar operation. The counter value is independently issued by the first CPU 1 and the second CPU 2. Because the first CPU 1 and the second CPU 2 have different initial values of the counter, the first CPU 1 and the second CPU 2 will not issue the same counter values a plurality of times consecutively.

The difference between the counter value issued by the master and the counter value received by the master from a slave is always 1 if the communication is normal. However, if the communication fails for some reason, the difference is 2 or greater. If the difference exceeds a preset permissible value, the master (numerical controller 10) detects this as an alarm that cannot be overlooked. Also, the difference between the counter value received by the slave and the counter value stored in the slave is similarly 1 if the communication is normal. However, if the communication fails for some reason, the difference is 2 or greater. If the difference exceeds a preset permissible value, this is similarly detected as an alarm that cannot be overlooked. Further, if the difference is 0, this means that the counter value issued by the first CPU 1 or the second CPU 2 is not updated. If the counter value is not updated a number of times exceeding a preset permissible number of times consecutively, this is also detected as an alarm that cannot be overlooked.

As shown in FIG. 8, CRC 513 is attached to the end of safety communication data and this protects the serial number, the counter, and safety I/O data. The first CPU 1, the second CPU 2, and the safety communication data processing circuit (see the safety communication data processing circuit n5 in FIG. 9) contained in the slave check the CRC when receiving data. If invalid CRC is detected, an error occurs or an alarm is issued, and the received data is discarded.

Figure 11:
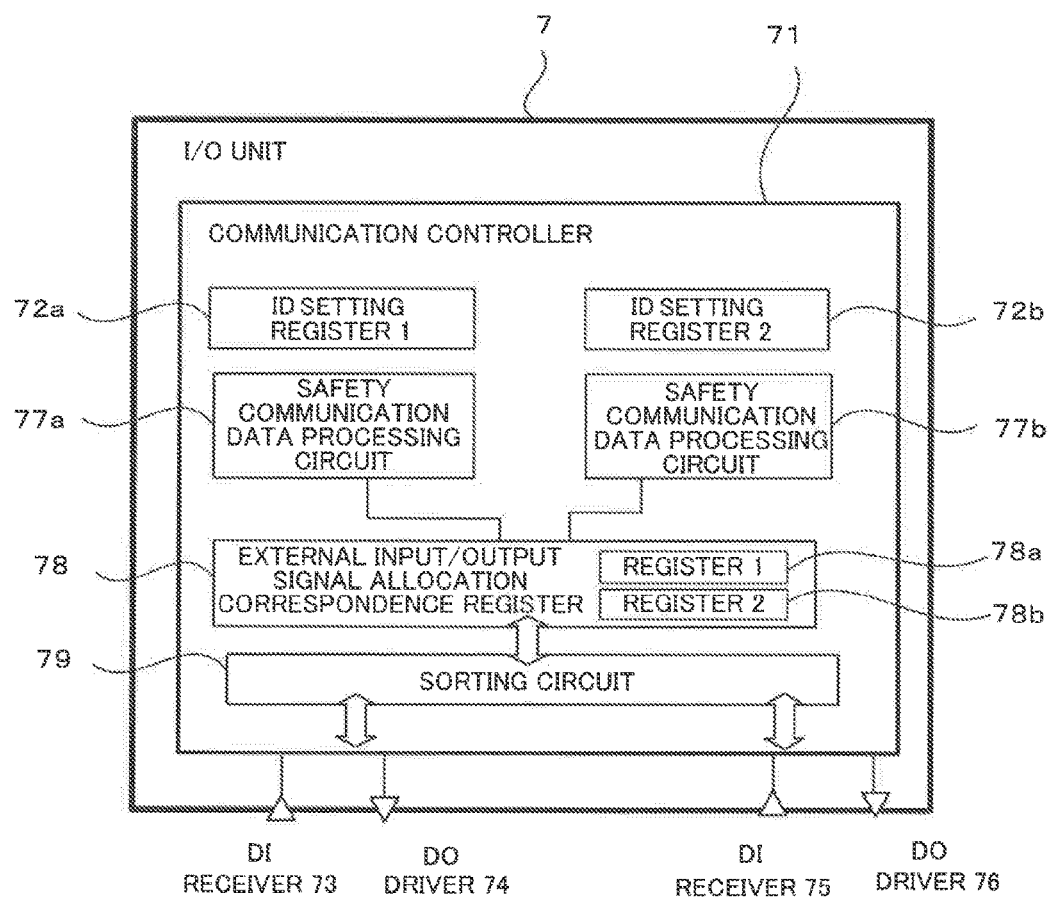
FIG. 11 is a diagram showing the IO unit communicating with a plurality of CPUs.

FIG. 11 is a diagram showing the IO unit communicating with a plurality of CPUs.

According to conventional technology, one ID setting register and one safety communication data processing circuit (see FIG. 9) are contained for each communication controller. However, a safety communication system according to an embodiment of the present invention includes an IO unit containing two such safety communication data processing circuits. If the communication controller 71 of the third IO unit 7 confirms that the ID contained in the header of the dada received by the communication controller 71 matches any one of two (first and second) ID setting registers 72a, 72b of the communication controller 71, then the communication controller recognizes that received data is data addressed to the communication controller 71.

The communication controller 71 also has safety communication data processing circuits 77a, 77b corresponding to two IDs (ID1, ID2). The safety communication data processing circuit 77a or the safety communication data processing circuit 77b corresponding to the received ID operates and processes safety communication data. Further, the communication controller 71 has an external input/output signal allocation correspondence register configured to specify a driver and a receiver to be allocated using the respective IDs so that DI/DO to be transmitted/received is allocated to the external input/output driver/receiver according to the preset external input/output signal allocation correspondence register.

Figure 12:
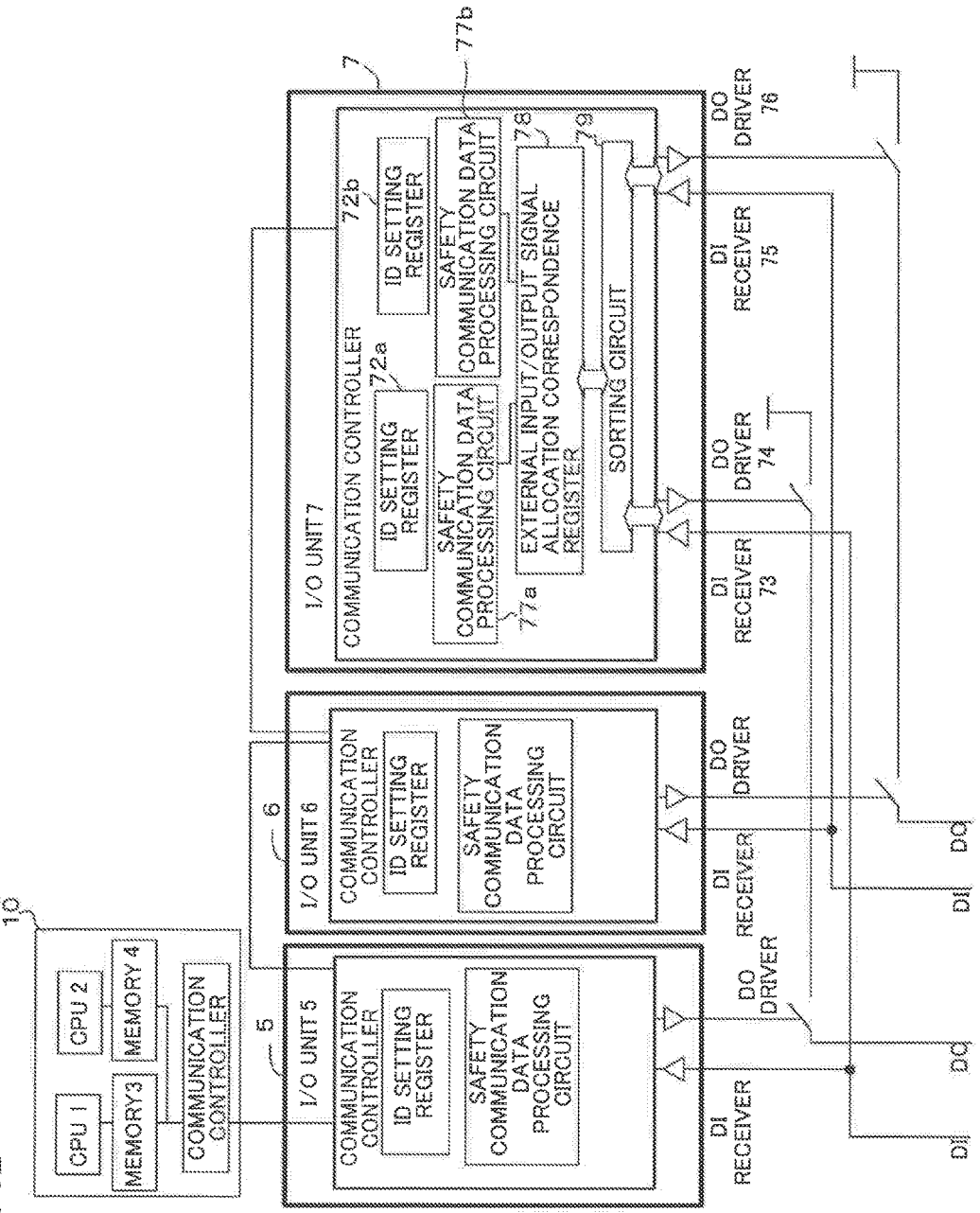
FIG. 12 is a diagram showing the configuration of the safety communication system that includes the IO units communicating with the plurality of CPUs of the numerical controller.

FIG. 12 is a diagram showing the configuration of a safety communication system using IO units communicating with a plurality of CPUs of the numerical controller.

A communication controller performs safety data communication by using the ID1 in communication with the first CPU 1 and inputs and outputs DI/DO through drivers/receivers according to the preset external input/output signal allocation correspondence register. In communication with the second CPU 2, the communication controller performs safety data communication by using the ID2 and inputs and outputs DI/DO through drivers/receivers according to the preset external input/output signal allocation correspondence register.

The invention claimed is:
1. A communication system, comprising:
a numerical controller; and
a plurality of input/output (IO) units connected to the numerical controller,
wherein each of the plurality of IO units includes
a communication controller to transmit and receive communication data between the numerical controller and the communication controllers of the plurality of IO units, and
a plurality of receiver/driver pairs to receive/transmit external input/output signals from/to an external device different from the numerical controller and from other IO units among the plurality of IO units, wherein the communication controller comprises:
- a plurality of ID setting units configured to set IDs of said communication controller; and
- an external input/output signal allocation correspondence setting unit configured to specify, from among the plurality of receiver/driver pairs and by using the IDs set to the plurality of ID setting units, a receiver/driver pair to which the communication data corresponds, and wherein, when an ID contained in the communication data received from the numerical controller matches any one of the IDs set to the plurality of ID setting units, the communication controller is configured to return a counter value to the numerical controller, and input/output the external input/output signals from/to the external device via the receiver/driver pair specified by the external input/output signal allocation correspondence setting unit as corresponding to the ID contained in the communication data.

* * * * *